US011092846B2

(12) United States Patent
Wang (10) Patent No.: US 11,092,846 B2
(45) Date of Patent: Aug. 17, 2021

(54) DISPLAY APPARATUS

(71) Applicant: Au Optronics Corporation, Hsinchu (TW)

(72) Inventor: Cheng-Kuang Wang, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/852,563

(22) Filed: Apr. 20, 2020

(65) Prior Publication Data

US 2021/0173258 A1    Jun. 10, 2021

(30) Foreign Application Priority Data

Dec. 4, 2019 (TW) ................................ 108144270

(51) Int. Cl.
| | | |
|---|---|---|
| *G02F 1/00* | (2006.01) | |
| *G02F 1/13357* | (2006.01) | |
| *G02F 1/1335* | (2006.01) | |

(52) U.S. Cl.
CPC .. *G02F 1/133605* (2013.01); *G02F 1/133512* (2013.01); *G02F 1/133606* (2013.01); *G02F 1/133611* (2013.01)

(58) Field of Classification Search
CPC ........ G02F 1/133514; G02F 1/133509; G02F 1/133512; G02F 1/133606; G02F 1/133611
See application file for complete search history.

(56) References Cited

U.S. PATENT DOCUMENTS

| | | | |
|---|---|---|---|
| 6,456,354 B2 | 9/2002 | Greene et al. | |
| 9,612,374 B2 | 4/2017 | Tian | |
| 9,910,327 B2 | 3/2018 | Zhang | |
| 2002/0097356 A1* | 7/2002 | Kawase | ............ G02F 1/133555 |
| 2015/0109814 A1* | 4/2015 | Chen | ..................... G02B 6/005 |
| | | | 362/606 |
| 2015/0362644 A1 | 12/2015 | Tian | |
| 2017/0248827 A1 | 8/2017 | Zhang | |
| 2017/0261808 A1* | 9/2017 | Sakai | ................ G02F 1/133514 |
| 2018/0284553 A1* | 10/2018 | Yasui | ................ G02F 1/133528 |

FOREIGN PATENT DOCUMENTS

| | | |
|---|---|---|
| CN | 202008538 | 10/2011 |
| CN | 104076549 | 10/2014 |
| CN | 105093654 | 11/2015 |

\* cited by examiner

*Primary Examiner* — Y M. Quach Lee
(74) *Attorney, Agent, or Firm* — JCIPRNET (57) ABSTRACT

A display apparatus including at least one display panel, a backlight module and a first reflective layer is provided. The display panel includes first and second substrates, non-self-luminous display pixels, a light-shielding layer, first and second polarizers. The light-shielding layer includes light-shielding portions and first opening portions. The light-shielding portions respectively surround outer profiles of the non-self-luminous display pixels, and positions of the first opening portions respectively correspond to positions of the non-self-luminous display pixels. The first and second substrates are disposed between the first and second polarizers. The backlight module is disposed under the display panel. The first reflective layer is disposed between the second polarizer and the backlight module. The first reflective layer includes second opening portions, and positions of the second opening portions respectively correspond to the positions of the non-self-luminous display pixels.

19 Claims, 6 Drawing Sheets

DISPLAY APPARATUS

CROSS-REFERENCE TO RELATED APPLICATION

This application claims the priority benefit of Taiwan patent application serial no. 108144270, filed on Dec. 4, 2019. The entirety of the above-mentioned patent application is hereby incorporated by reference and made a part of this specification.

BACKGROUND

Technical Field

The invention relates to a display apparatus.

Description of Related Art

Along with development of science and technology, display apparatuses are used in a large number of consumer electronic products. Although a display apparatus with a single display panel may now achieve a size of 80 inches or even 100 inches, it still cannot meet the needs of users in situations where large-screen displays are required (such as a monitoring room, etc.), so that a spliced type display apparatus formed by splicing a plurality of display apparatuses is accordingly developed, and how to improve optical efficiency of a single type display apparatus or a spliced type display apparatus has become one of the subjects that the industry strives for.

SUMMARY

The invention is directed to a display apparatus, which has good optical efficiency in a single type or a spliced type.

An embodiment of the invention provides a display apparatus including at least one display panel, a backlight module and a first reflective layer. The display panel includes a first substrate, a second substrate, a plurality of non-self-luminous display pixels, a light-shielding layer, a first polarizer and a second polarizer. Each of the non-self-luminous display pixels includes at least one non-self-luminous sub-display pixel. The light-shielding layer includes a plurality of light-shielding portions and a plurality of first opening portions. The light-shielding portions respectively surround outer profiles of the non-self-luminous display pixels, and positions of the first opening portions respectively correspond to positions of the non-self-luminous display pixels. The non-self-luminous display pixels and the light-shielding layer are disposed between the first substrate and the second substrate. The first substrate and the second substrate are disposed between the first polarizer and the second polarizer. The backlight module is disposed under the display panel. The first reflective layer is disposed between the second polarizer and the backlight module. The first reflective layer includes a plurality of second opening portions, and positions of the second opening portions respectively correspond to the positions of the non-self-luminous display pixels.

In an embodiment of the invention, an amount of the at least one display panel is plural, and the display panels are commonly spliced into a spliced type display panel.

In an embodiment of the invention, the first reflective layers of the display panels are separated from each other.

In an embodiment of the invention, the first reflective layers of the display panels are connected to each other.

In an embodiment of the invention, the display panels include a first display panel and a second display panel adjacent to each other, the non-self-luminous display pixel adjacent to an edge of the first display panel is a first non-self-luminous display pixel, the non-self-luminous display pixel adjacent to an edge of the second display panel is a second non-self-luminous display pixel, and a width of the light-shielding portion between two adjacent non-self-luminous display pixels in each of the display panels is substantially the same with a distance between the first non-self-luminous display pixel and the second non-self-luminous display pixel.

In an embodiment of the invention, the first reflective layer further includes a plurality of reflective portions, and positions of the reflective portions respectively correspond to the light-shielding portions.

In an embodiment of the invention, the backlight module further includes a light guide plate, at least one light-emitting element, and a plurality of optical films. The light guide plate has a first surface, a second surface, and a light entering surface. The first surface is opposite to the second surface, and the light entering surface is connected to the first surface and the second surface. The at least one light-emitting element is disposed beside the light entering surface, and the light-emitting element is configured to emit a light beam. A plurality of the optical films are disposed on at least one of two opposite sides of the light guide plate.

In an embodiment of the invention, the optical films include a brightness enhancement film, a diffusion film, and a second reflective layer. The brightness enhancement film and the diffusion film are disposed at one side of the light guide plate, the brightness enhancement film is disposed between the diffusion film and the second polarizer, and the diffusion film is disposed between the brightness enhancement film and the light guide plate. The second reflective layer is disposed on the other side of the light guide plate, and the light guide plate is disposed between the second reflective layer and the diffusion film.

In an embodiment of the invention, the backlight module is configured to provide an illumination beam to the display panel, and the non-self-luminous display pixels convert the illumination beam into an image beam after receiving the illumination beam.

In an embodiment of the invention, the non-self-luminous display pixel includes a first non-self-luminous sub-display pixel, a second non-self-luminous sub-display pixel and a third non-self-luminous sub-display pixel, and colors of light beams emitted by the first to third non-self-luminous sub-display pixels after receiving the illumination beam are different from each other.

Based on the above description, in the display apparatus of the embodiment of the invention, the first reflective layer is disposed between the second polarizer and the backlight module, and the opening portions (or referred to as the second opening portions) of the first reflective layer correspond to the positions of the non-self-luminous display pixels. By configuring the first reflective layer, a probability that the light beam from the backlight module is emitted from the opening portions of the first reflective layer is enhanced, which represents that the amount of light entering the non-self-luminous display pixels increases, so that the display apparatus has good optical efficiency.

DESCRIPTION OF THE EMBODIMENTS

Figure 1:
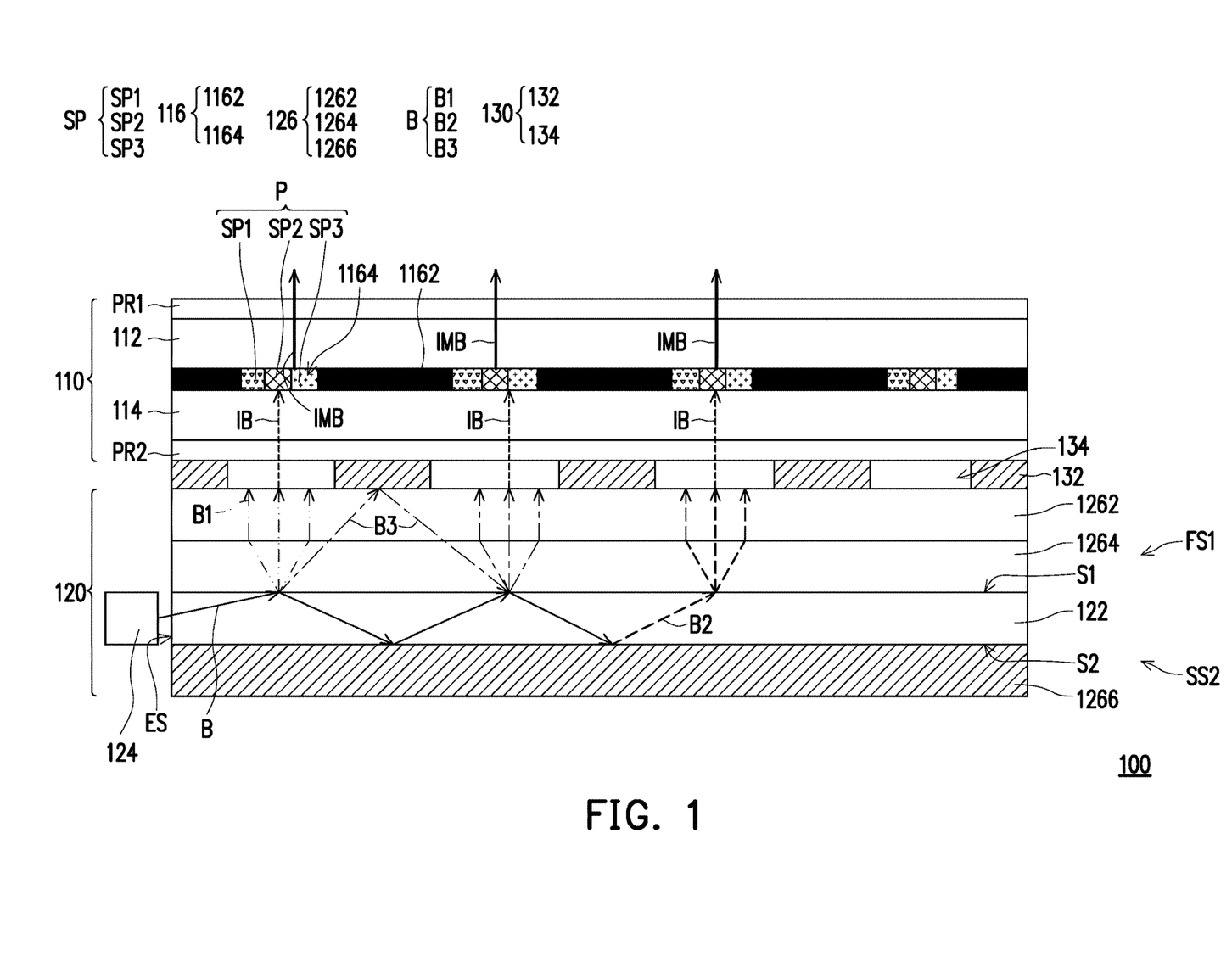
FIG. 1 is a schematic cross-sectional view of a display apparatus according to an embodiment of the invention.
Figure 2:
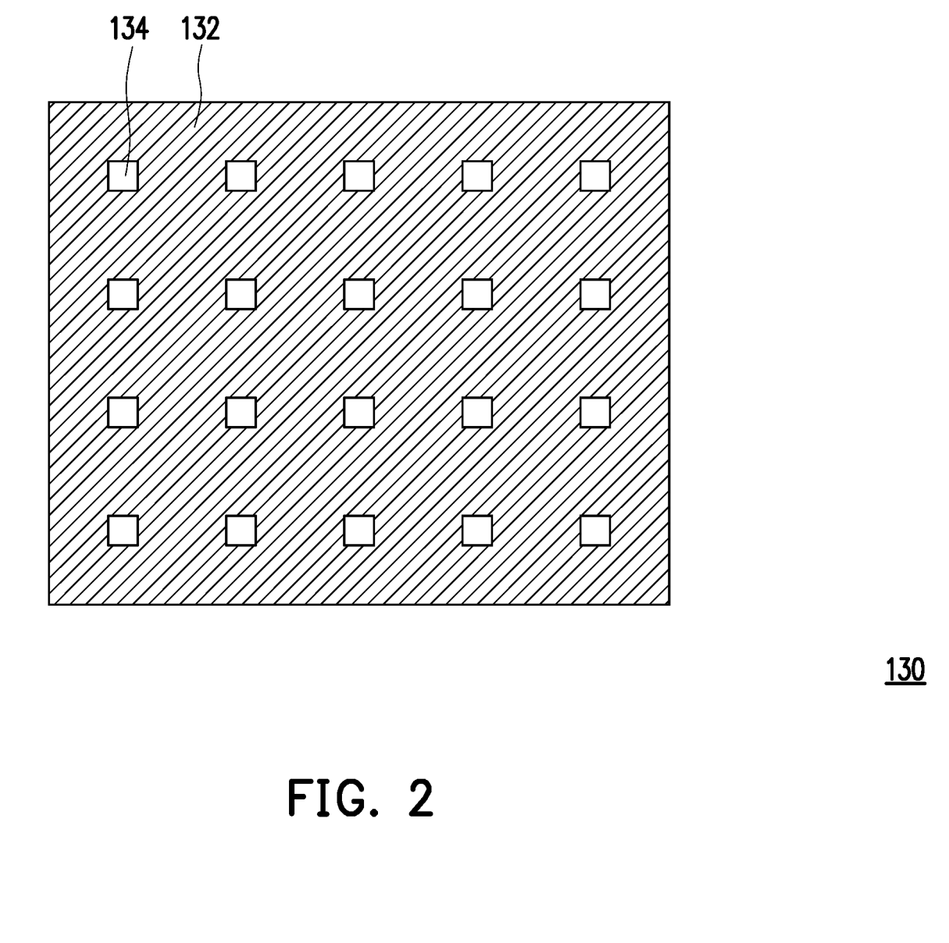
FIG. 2 is a schematic top view of a first reflective layer in the display apparatus.

FIG. 1 is a schematic cross-sectional view of a display apparatus according to an embodiment of the invention. FIG. 2 is a schematic top view of a first reflective layer in the display apparatus.

Referring to FIG. 1, in the embodiment, the display apparatus 100 is, for example, a single type display apparatus, which includes a single display panel 110, a backlight module 120, and a first reflective layer 130. The above components are to be explained in detail in the following paragraphs.

The display panel 110 is embodied as a liquid crystal display panel, which includes first and second substrates 112 and 114 (which are also referred to as upper and lower substrates), a plurality of non-self-luminous display pixels P (only one is marked as an example), a light-shielding layer 116, and first and second polarizers PR1 and PR2 (which are also referred to as upper and lower polarizers). The first and second substrates 112 and 114 are, for example, glass substrates, but the invention is not limited thereto. The non-self-luminous display pixel P does not emit light itself and needs to be illuminated by a light source to achieve a display function, and includes at least one non-self-luminous sub-display pixel SP, where the non-self-luminous sub-display pixel SP includes a switch element, a liquid crystal layer and a color filter layer, and a number of the non-self-luminous sub-display pixels SP included in each of the non-self-luminous display pixels P is, for example, three, which are respectively referred to as first to third non-self-luminous sub-display pixels SP1 to SP3, but the invention is not limited to the above number of the non-self-luminous sub-display pixels. The first to third non-self-luminous sub-display pixels SP1 to SP3 are respectively configured with red, green, and blue color filter layers. The red color filter layer is pervious to red light and filters other color light, the green color filter layer is pervious to green light and filters other color light, and the blue color filter layer is pervious to blue light and filters other color light. The light-shielding layer 116 includes a plurality of light-shielding portions 1162 and a plurality of first opening portions 1164, where the light-shielding portions 1162 (or referred to as black matrices) are elements with a function of shielding light beams, and the first opening portions 1164 are pervious to the light beams.

The backlight module 120 is configured to provide an illumination beam IB to the display panel 110, and includes a light guide plate (LGP) 122, at least one light-emitting element 124 (only one is shown as an example in FIG. 1), and a plurality of optical films 126. The LGP 122 is an optical element that guides a transmission direction of the light beam in the backlight module 120, which has first and second surfaces (also referred to as upper and lower surfaces) S1 and S2, and a light entering surface ES, where the first surface S1 is opposite to the second surface S2, the light entering surface ES is connected to the first and second surfaces S1 and S2, and the first and second surfaces S1 and S2 are configured with a plurality of microstructures (not shown). The at least one light-emitting element 124 may be an optical element with a light-emitting function such as a light-emitting diode (LED), an organic light-emitting diode (OLED), a polymer organic light-emitting diode (POLED), or a laser diode (LD), etc., but the invention is not limited thereto. The light-emitting element 124 is configured to emit a light beam B. The light beam B is, for example, white light, but the invention is not limited thereto. The optical films 126 generally refer to optical film layers with different optical functions. To be specific, the optical films 126 include at least one of a brightness enhancement film 1262 and a diffusion film 1264, and a second reflective layer 1266. In other embodiments, the backlight module 120 may include at least one light-emitting element 124 and at least one optical film 126. The at least one light-emitting element 124 may be disposed under the at least one optical film 126. The at least one optical film 126 may include at least one of the brightness enhancement film 1262 and the diffusion film 1264, and the second reflective layer 1266, and the at least one light-emitting element 124 is located between at least one of the brightness enhancement film 1262 and the diffusion film 1264, and the second reflective layer 1266. Namely, when the brightness enhancement film 1262 is adopted to implement the optical film, the at least one light-emitting element 124 is located between the brightness enhancement film 1262 and the second reflective layer 1266. Alternatively, when the diffusion film 1264 is adopted to implement the optical film, the at least one light-emitting element 124 is located between the diffusion film 1264 and the second reflective layer 1266. Or alternatively, when a stacked film or a composite functional film of the brightness enhancement film 1262 and the diffusion film 1264 is adopted to implement the optical film, the at least one light-emitting element 124 is located between the stacked film or the composite functional film of the brightness enhancement film 1262 and the diffusion film 1264, and the second reflective layer 1266. The brightness enhancement film 1262 may be a prism sheet or a dual brightness enhancement film (DBEF), and a main function thereof is to deflect the light beam to a front viewing angle direction, so as to achieve effects of collecting light and enhancing brightness. The diffusion film 1264 may diffuse (scatter) the light beam passing through the diffusion film 1264. The second reflective layer 1266 has a light reflection function, and a material thereof is, for example, a metal with high reflectivity, but the invention is not limited thereto.

The first reflective layer 130 has the light reflection function, and a material thereof is, for example, a metal with high reflectivity, but the invention is not limited thereto. Referring to FIG. 1 and FIG. 2, the first reflective layer 130 has a plurality of reflective portions 132 and a plurality of second opening portions 134, where the reflective portions 132 are portions of the first reflective layer 130 having a reflection function, and the second opening portions 134 allow the light beam to pass through.

In the following paragraphs, configuration relationships of the above components are to be described in detail.

Referring to FIG. 1, the non-self-luminous display pixels P and the light-shielding layer 116 are disposed between the first substrate 112 and the second substrate 114. The light-shielding portions 1162 respectively surround outer profiles of the non-self-luminous display pixels P, and positions of the first opening portions 1164 respectively correspond to positions of the non-self-luminous display pixels P, i.e., the non-self-luminous display pixels P are respectively disposed in the first opening portions 1164. The first substrate 112 and the second substrate 114 are disposed between the first polarizer PR1 and the second polarizer PR2. The backlight module 120 is disposed under the display panel 110. The first reflective layer 130 is disposed between the second polarizer PR2 and the backlight module 120. Positions of the reflective portions 132 of the first reflective layer 130 respectively correspond to the light-shielding portions 1162. The second opening portions 134 respectively correspond to the positions of the non-self-luminous display pixels P, i.e., orthographic projections of the second opening portions 134 are respectively overlapped with the non-self-luminous display pixels P. The optical films 126 may be disposed on at least one of two opposite sides of the LGP 122 according to different optical requirements. To be specific, in the embodiment, the brightness enhancement film 1262 and the diffusion film 1264 are disposed at a first side FS1 of the LGP 122, the brightness enhancement film 1262 is disposed between the diffusion film 1264 and the second polarizer PR2, and the diffusion film 1264 is disposed between the brightness enhancement film 1262 and the LGP 122. The second reflective layer 1266 is disposed at a second side SS2 of the LGP 122.

Optical effects of the display apparatus 100 of the embodiment are to be described in detail in the following paragraphs.

Referring to FIG. 1, when the at least one light-emitting element 124 in the backlight module 120 emits the light beam B, the light beam B enters the LGP 122 from the light entering surface ES, and implements one or multiple total internal reflections between the first and second surfaces S1 and S2 of the LGP 122. In the process of total internal reflection, the total internal reflection of the light beam B is destroyed by the microstructures on the first and second surfaces S1 and S2 to emit light. For simplicity's sake, the light beam emitted directly from the first surface S1 is indicated as B1, and the light beam emitted from the second surface S2 is indicated as B2. After the total internal reflection of the light beam B1 is destroyed by the microstructures on the first surface S1, the light beam B1 is emitted from the first surface S1, and is diffused by the diffusion film 1264, and is then deflected by the brightness enhancement film 1262 to the front viewing angle, and is emitted out from the backlight module 120 to serve as part of the illumination beam B3. On the other hand, after the total internal reflection of the light beam B2 is destroyed by the microstructures on the second surface S2, the light beam B2 is emitted from the second surface S2, and is reflected by the second reflective layer 1266 to again penetrate through the LGP 122 and is emitted out from the first surface S1, and the subsequent optical behaviours of the light beam B2 is similar to that of the light beam B1, and details thereof are not repeated. In other words, the second reflective layer 1266 has an effect of recycling light beams. Similarly, the light beam B2 also serves as a part of the illumination beam IB. On the other hand, on a part of the first surface S1, a part of a light beam B3 may penetrate through the diffusion film 1264 and the brightness enhancement film 1262 to reach the reflective portions 132, and the reflective portions 132 reflect the light beam B3 to the LGP 122 or the second reflective layer 1266, and then the light beam B3 is reflected by the LGP 122 or the second reflective layer 1266 and is emitted out from the second opening portions 134, such that the amount of light emitted from the positions of the non-self-luminous display pixels P corresponding to the second opening portions 134 is increased, so as to improve the optical efficiency of the display apparatus 100.

Referring to FIG. 1 again, the illumination beam IB sequentially penetrates the second opening portions 134 of the first reflective layer 130, the second polarizer PR2, and the second substrate 114 to reach the non-self-luminous display pixels P. Each of the non-self-luminous display sub-pixels SP in each of the non-self-luminous display pixels P is controlled by a corresponding switch element to convert the illumination beam IB into the image beam IMB of a different color. The image beam IMB sequentially penetrates through the first substrate 112 and the first polarizer PR1 and is emitted from the display apparatus 100 for the user to view.

Figure 3A:
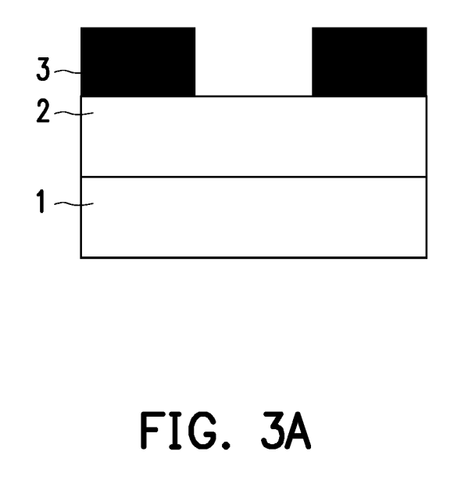
FIG. 3A and FIG. 3B are schematic cross-sectional views of different layouts in a display apparatus.
Figure 3B:
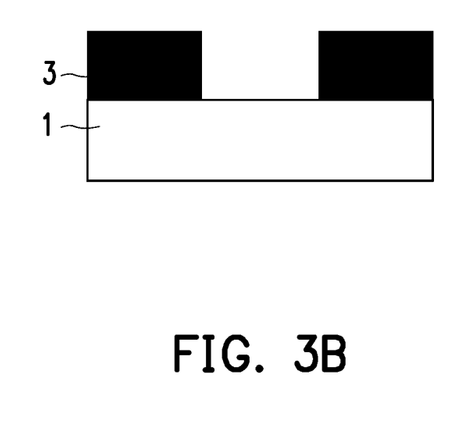

FIG. 3A and FIG. 3B are schematic cross-sectional views of different layouts in a display apparatus. The layout of FIG. 3A includes a backlight module 1, a lower polarizer 2 and a material layer 3. The layout of FIG. 3B includes the backlight module 1 and the material layer 3. In other words, the layout of FIG. 3A includes the polarizer, while the layout of FIG. 3B does not. A following table 3 shows brightness performance of various combinations in the layouts of FIG. 3A and FIG. 3B, where a field of "backlight module 1 is configured with DBEF" in the table 3 refers to that the backlight module 1 includes a reflective polarized brightness enhancement film, and a field of "backlight module 1 is not configured with DBEF" refers to that the backlight module 1 does not include the reflective polarized brightness enhancement film. A field of "black paper" refers to that the material layer 3 includes black paper, and a field of "first reflective layer" refers to that the material layer 3 includes the first reflective layer 130 as shown in FIG. 2. A field of "gain" refers to a brightness ratio (without unit) of a brightness of the material layer using the first reflective layer and a brightness of the material layer using the black paper, i.e., the brightness of the material layer using the first reflective layer/the brightness of the material layer using the black paper.

TABLE 3

| | Layout of FIG. 3A | | | | Layout of FIG. 3B | | | |
|---|---|---|---|---|---|---|---|---|
| | Backlight module 1 is configured with DBEF | | Backlight module 1 is not configured with DBEF | | Backlight module 1 is configured with DBEF | | Backlight module 1 is not configured with DBEF | |
| | Black paper | First reflective layer | Black paper | First reflective layer | Black paper | First reflective layer | Black paper | First reflective layer |
| Brightness (nit) | 70 | 79 | 120 | 170 | 70 | 367.4 | 284.5 | >1000 |
| Gain | 1 | 1.13 | 1 | 1.42 | 1 | 5.24 | 1 | >3.5 |

According to the above table 3, it is known that compared with the design of using black paper, in different layouts, the use of the first reflective layer 130 of the embodiment may greatly improve the brightness, and an effect thereof is better than an effect of using black paper.

Referring to FIG. 1, based on the above description, in the display apparatus 100 of the embodiment, since the first reflective layer 130 is disposed between the second polarizer PR2 and the backlight module 120, and the second opening portions 134 of the first reflective layer 130 correspond to the positions of the non-self-luminous display pixels P, when a part of the light beam B3 is emitted from the first surface S1 of the LGP 122, at least a part of the light beam B3 is again reflected back to the backlight module 120 by the reflective portions 132, and is again subjected to the optical functions (reflection and refraction) of the backlight module 120, and is emitted from the second opening portions 134. Since the positions of the second opening portions 134 correspond to the positions of the non-self-luminous display pixels P, if the amount of light emitted from the second opening portions 134 is increased, it represents that the amount of light entering the non-self-luminous display pixels P is increased, which may also improve the optical efficiency of the display apparatus 100.

Conversely, if the first reflective layer 130 is not configured, at least a part of the light beam B3 may be transmitted to the light-shielding portions 1162 and absorbed by the light-shielding portions 1162. In other words, by configuring the first reflective layer 130, the display apparatus 100 of the embodiment increases the probability that the light beam is transmitted to the second opening portions 134, and avoids the situation that the light beam is transmitted to the light-shielding portions 1162 as much as possible, so as to increase the overall optical efficiency.

Moreover, there are several methods for manufacturing the aforementioned display apparatus 100. A first method is to first provide the display panel 110, and print the first reflective layer 130 on the second polarizer PR2 of the display panel 110 in a manner of printing, and then attach the display panel 110 configured with the first reflective layer 130 to the backlight module 120. A second method is to first provide the backlight module 120, and print the first reflective layer 130 on the brightness enhancement film 1262 of the backlight module 120 in the manner of printing, and then attach the display panel 110 to the backlight module 120 configured with the first reflective layer 130. A third method is to first produce the first reflective layer 130, and then sandwich the first reflective layer 130 between the display panel 110 and the backlight module 120, but the invention is not limited to the above methods.

It should be noted that a part of contents of the aforementioned embodiment is also used in the following embodiment, and descriptions of the same technical contents are omitted. The part of contents of the aforementioned embodiment may be referred for descriptions of the same components, and detailed descriptions thereof are not repeated in the following embodiment.

Figure 4:
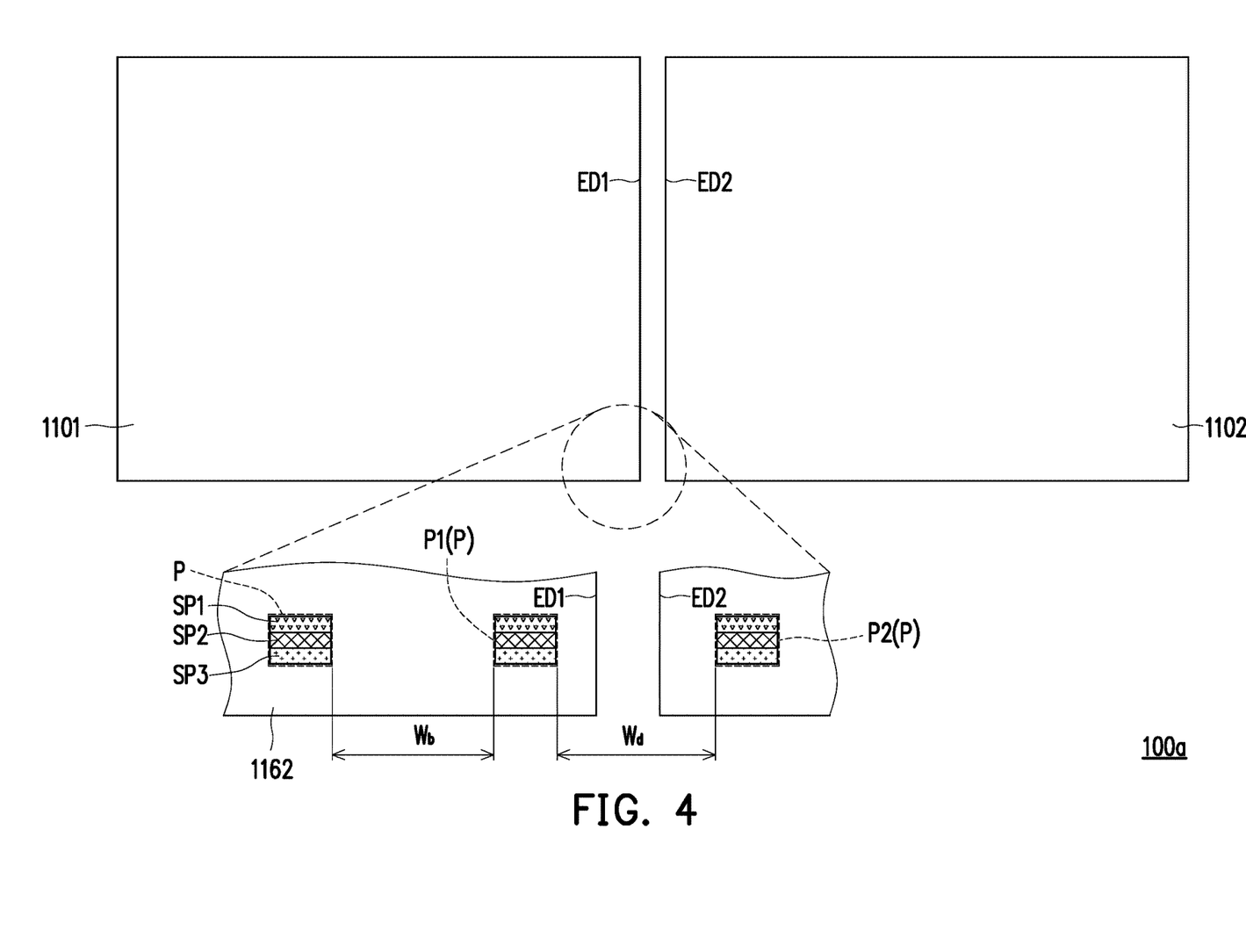
FIG. 4 is a schematic top view of another display apparatus of the invention.
Figure 5A:
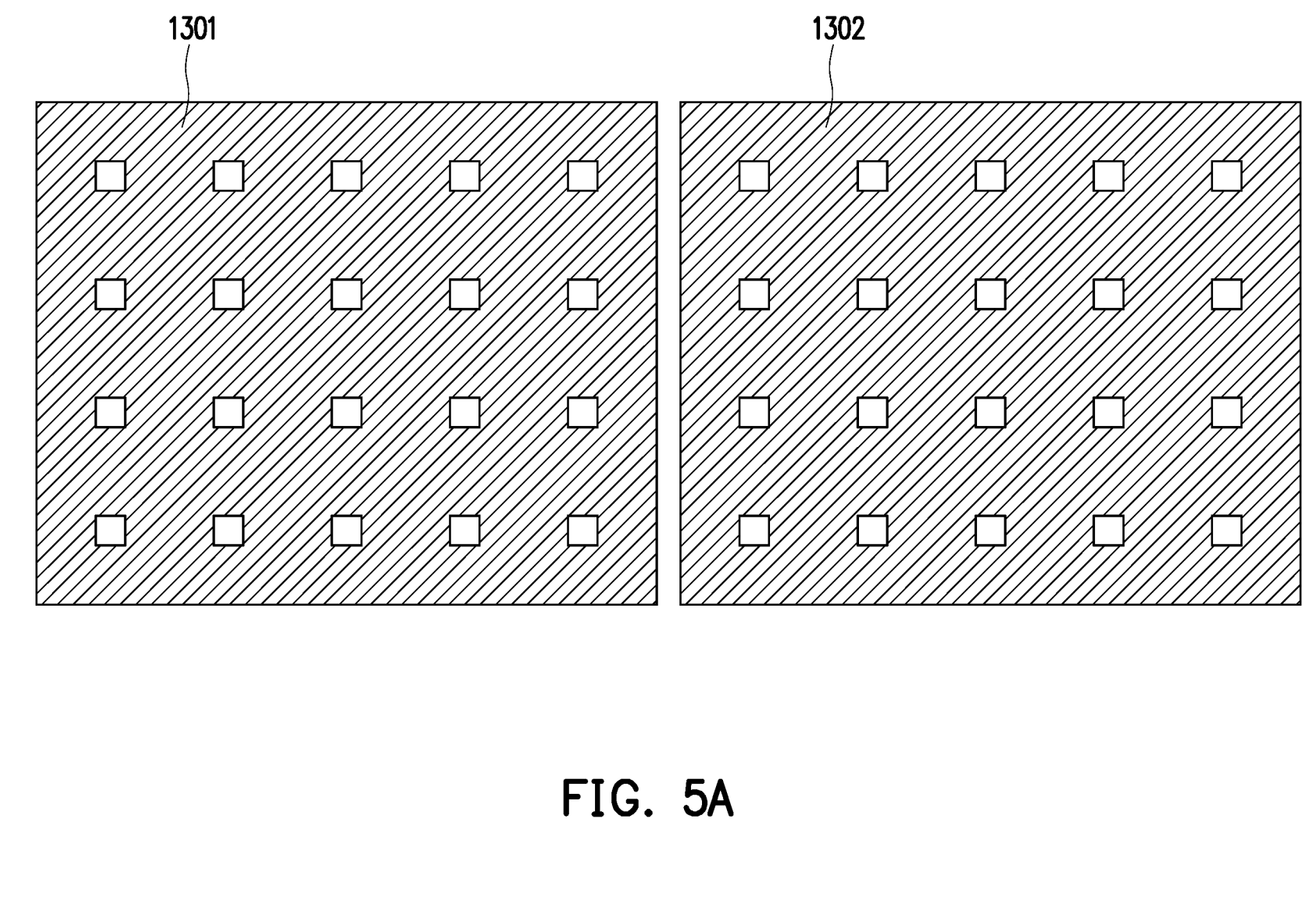
FIG. 5A and FIG. 5B are respectively schematic top views of first reflective layers of different display panels in the display apparatus.
Figure 5B:
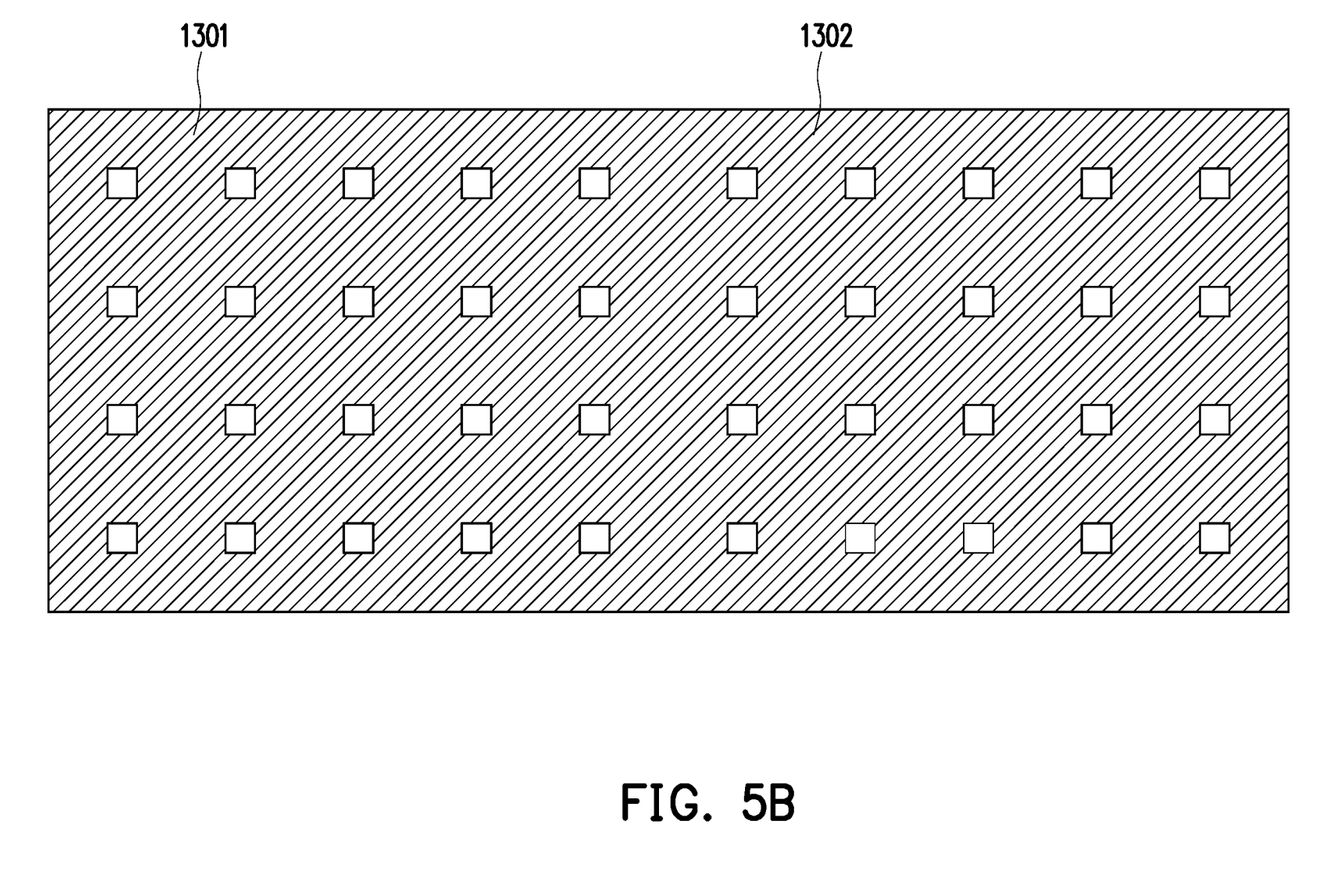

FIG. 4 is a schematic top view of another display apparatus of the invention. FIG. 5A and FIG. 5B are respectively schematic top views of first reflective layers of different display panels in the display apparatus.

Referring to FIG. 4, FIG. 5A and FIG. 5B, a display apparatus 100a of FIG. 4 is substantially similar to the display apparatus of FIG. 1, and a main difference there between is that the display apparatus 100a of FIG. 4 is a spliced type display apparatus, which is, for example, formed by splicing a plurality of the display panels 110 as shown in FIG. 1. In FIG. 4, two display panels 1101 (or referred to as a first display panel) and 1102 (or referred to as a second display panel) are, for example, spliced, but the invention is not limited thereto, where the first reflective layers respectively included in the display panels 1101 and 1102 are indicated as 1301 and 1302. In the display panels 1101 and 1102, the non-self-luminous display pixel P adjacent to an edge ED1 of the display panel 1101 is referred to as a first non-self-luminous display pixel P1, and the non-self-luminous display pixel P adjacent to an edge ED2 of the display panel 1102 is referred to as a second non-self-luminous display pixel P2, where the edge ED1 faces the edge ED2. A width $W_b$ of the light-shielding portion 1162 between two adjacent non-self-luminous display pixels P in each display panel 110 is substantially the same as a distance $W_d$ between the first non-self-luminous display pixel P1 and the second non-self-luminous display pixel P2. According to such design, when the user views the spliced type display apparatus 100a of FIG. 4, the user is not easy to feel existence of the distance $W_d$ visually.

Referring to FIG. 5A and FIG. 5B, different layouts may also be adopted for the first reflective layers 1301 and 1302 of the display panels 1101 and 1102. Referring to FIG. 5B, in one layout, the first reflective layers 1301 and 1302 of the display panels 1101 and 1102 are connected to each other. Referring to FIG. 5A, in another layout, the first reflective layers 1301 and 1302 of the display panels 1101 and 1102 are separated from each other, which is not limited by the invention.

In summary, in the display apparatus of the embodiment of the invention, since the first reflective layer is disposed between the second polarizer and the backlight module, and the second opening portions of the first reflective layer correspond to the positions of the non-self-luminous display pixels, when a part of the light beam is emitted from a part of the first surface corresponding to the first reflective layer, at least a part of the light beam may be again reflected back to the backlight module by the first reflective layer, and such part of the light beam is subjected to the optical functions (reflection and refraction) of the backlight module, and is emitted from the second opening portions. Since the positions of the second opening portions correspond to the positions of the non-self-luminous display pixels, if the amount of light emitted from the second opening portions is increased, the amount of light entering the non-self-luminous display pixels is increased, which may improve the optical efficiency of the display apparatus.

Further, since the optical efficiency of the single display apparatus may be further improved by the arrangement of the first reflective layer, when the display apparatuses of the embodiment are spliced into a spliced type display apparatus, the spliced type display apparatus may also have good optical efficiency.

What is claimed is:
1. A display apparatus, comprising:
   at least one display panel, comprising:
      a first substrate;
      a second substrate;
      a plurality of non-self-luminous display pixels, each of the non-self-luminous display pixels comprising at least one non-self-luminous sub-display pixel;
      a light-shielding layer, comprising a plurality of light-shielding portions and a plurality of first opening portions, wherein the light-shielding portions respectively surround outer profiles of the non-self-luminous display pixels, and positions of the first opening portions respectively correspond to positions of the non-self-luminous display pixels,
wherein the non-self-luminous display pixels and the light-shielding layer are disposed between the first substrate and the second substrate;
a first polarizer; and
a second polarizer, wherein the first substrate and the second substrate are disposed between the first polarizer and the second polarizer;
a backlight module, disposed under the display panel, wherein the second polarizer is disposed between the second substrate and the backlight module; and
a first reflective layer, disposed between the second polarizer and the backlight module, wherein the first reflective layer comprises a plurality of second opening portions, and positions of the second opening portions respectively correspond to the positions of the non-self-luminous display pixels.

2. The display apparatus as claimed in claim 1, wherein an amount of the at least one display panel is plural, and the display panels are commonly spliced into a spliced type display panel.

3. The display apparatus as claimed in claim 2, wherein the first reflective layers of the display panels are separated from each other.

4. The display apparatus as claimed in claim 2, wherein the first reflective layers of the display panels are connected to each other.

5. The display apparatus as claimed in claim 2, wherein the display panels comprise a first display panel and a second display panel adjacent to each other, the non-self-luminous display pixel adjacent to an edge of the first display panel is a first non-self-luminous display pixel, the non-self-luminous display pixel adjacent to an edge of the second display panel is a second non-self-luminous display pixel, and a width of the light-shielding portion between the two adjacent non-self-luminous display pixels in each of the display panels is substantially the same with a distance between the first non-self-luminous display pixel and the second non-self-luminous display pixel.

6. The display apparatus as claimed in claim 1, wherein the first reflective layer further comprises a plurality of reflective portions, and positions of the reflective portions respectively correspond to the light-shielding portions.

7. The display apparatus as claimed in claim 1, wherein the backlight module further comprises:
a light guide plate, having a first surface, a second surface, and a light entering surface, wherein the first surface is opposite to the second surface, and the light entering surface is connected to the first surface and the second surface;
at least one light-emitting element, disposed beside the light entering surface, and the light-emitting element being configured to emit a light beam; and
a plurality of optical films, disposed on at least one of two opposite sides of the light guide plate.

8. The display apparatus as claimed in claim 7, wherein the optical films comprise a brightness enhancement film, a diffusion film, and a second reflective layer, wherein,
the brightness enhancement film and the diffusion film are disposed at one side of the light guide plate, the brightness enhancement film is disposed between the diffusion film and the second polarizer, and the diffusion film is disposed between the brightness enhancement film and the light guide plate,
the second reflective layer is disposed on the other side of the light guide plate, and the light guide plate is disposed between the second reflective layer and the diffusion film.

9. The display apparatus as claimed in claim 1, wherein the backlight module is configured to provide an illumination beam to the display panel, and the non-self-luminous display pixels convert the illumination beam into an image beam after receiving the illumination beam.

10. The display apparatus as claimed in claim 9, wherein the non-self-luminous display pixel comprises a first non-self-luminous sub-display pixel, a second non-self-luminous sub-display pixel and a third non-self-luminous sub-display pixel, and colors of light beams emitted by the first non-self-luminous sub-display pixel to the third non-self-luminous sub-display pixel after receiving the illumination beam are different from each other.

11. The display apparatus as claimed in claim 1, wherein the backlight module comprises:
at least one optical film, disposed under the display panel;
at least one light-emitting element, configured to emit a light beam to the at least one optical film.

12. The display apparatus as claimed in claim 11, wherein the at least one optical film comprises at least one of a brightness enhancement film and a diffusion film, and a second reflective layer, wherein the at least one light-emitting element is located between at least one of the brightness enhancement film and the diffusion film and the second reflective layer.

13. A display apparatus, comprising:
at least one display panel, comprising:
a first substrate;
a second substrate;
a plurality of non-self-luminous display pixels, each of the non-self-luminous display pixels comprising at least one non-self-luminous sub-display pixel;
a light-shielding layer, comprising a plurality of light-shielding portions and a plurality of first opening portions, wherein the light-shielding portions respectively surround outer profiles of the non-self-luminous display pixels, and positions of the first opening portions respectively correspond to positions of the non-self-luminous display pixels,
wherein the non-self-luminous display pixels and the light-shielding layer are disposed between an inner side of the first substrate and an inner side of the second substrate;
a first polarizer; and
a second polarizer, wherein the first substrate and the second substrate are disposed between the first polarizer and the second polarizer;
a backlight module, overlapped with the display panel; and
a first reflective layer, comprising a plurality of second opening portions, and positions of the second opening portions respectively correspond to the positions of the non-self-luminous display pixels, wherein the first reflective layer and the second polarizer are disposed on the same side of the second substrate.

14. The display apparatus as claimed in claim 13, wherein an amount of the at least one display panel is plural, and the display panels are commonly spliced into a spliced type display panel.

15. The display apparatus as claimed in claim 14, wherein the display panels comprise a first display panel and a second display panel adjacent to each other, the non-self-luminous display pixel adjacent to an edge of the first display panel is a first non-self-luminous display pixel, the non-self-luminous display pixel adjacent to an edge of the second display panel is a second non-self-luminous display pixel, and a width of the light-shielding portion between the two adjacent non-self-luminous display pixels in each of the display panels is substantially the same with a distance between the first non-self-luminous display pixel and the second non-self-luminous display pixel.

16. The display apparatus as claimed in claim 13, wherein the first reflective layer further comprises a plurality of reflective portions, and positions of the reflective portions respectively correspond to the light-shielding portions.

17. The display apparatus as claimed in claim 13, wherein the same side of the second substrate is an outer side of the second substrate.

18. The display apparatus as claimed in claim 13, wherein the first reflective layer and the second polarizer are disposed between the second substrate and the backlight module.

19. The display apparatus as claimed in claim 13, wherein the first polarizer is disposed on an outer side of the first substrate.

* * * * *